United States Patent
Lee et al.

(10) Patent No.: US 8,761,961 B2
(45) Date of Patent: Jun. 24, 2014

(54) ELECTRONIC DEVICE AND METHOD FOR CONTROLLING UNMANNED AERIAL VEHICLE USING THE SAME

(75) Inventors: Hou-Hsien Lee, Taipei Hsien (TW); Chang-Jung Lee, Taipei Hsien (TW); Chih-Ping Lo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 547 days.

(21) Appl. No.: 12/908,005

(22) Filed: Oct. 20, 2010

(65) Prior Publication Data

US 2012/0016534 A1 Jan. 19, 2012

(30) Foreign Application Priority Data

Jul. 14, 2010 (TW) ................................ 99123061 A (51) Int. Cl.
*G05D 1/00* (2006.01)
*G05D 3/00* (2006.01)

(52) U.S. Cl.
USPC ....... 701/2; 701/7; 701/11; 244/175; 244/190

(58) Field of Classification Search
None
See application file for complete search history.

(56) References Cited

U.S. PATENT DOCUMENTS

| | | | |
|---|---|---|---|
| 6,856,894 B1* | 2/2005 | Bodin et al. | 701/2 |
| 8,089,225 B2* | 1/2012 | Goossen | 318/16 |
| 8,108,085 B2* | 1/2012 | Builta et al. | 701/7 |
| 8,258,917 B2* | 9/2012 | Cai et al. | 340/4.13 |
| 8,577,535 B2* | 11/2013 | Cummings et al. | 701/23 |
| 8,600,432 B2* | 12/2013 | Krupnik | 455/550.1 |
| 2006/0058928 A1* | 3/2006 | Beard et al. | 701/11 |
| 2009/0009410 A1* | 1/2009 | Dolgin et al. | 343/703 |
| 2009/0027842 A1 | 1/2009 | Sandell et al. | |
| 2009/0153349 A1* | 6/2009 | Lin et al. | 340/825 |
| 2009/0222149 A1* | 9/2009 | Murray et al. | 701/2 |
| 2010/0017124 A1* | 1/2010 | Zhao et al. | 701/212 |
| 2010/0036635 A1* | 2/2010 | Bourzier | 702/113 |
| 2010/0203933 A1* | 8/2010 | Eyzaguirre et al. | 463/2 |
| 2010/0250022 A1* | 9/2010 | Hines et al. | 701/2 |
| 2011/0304737 A1* | 12/2011 | Evans et al. | 348/169 |
| 2012/0004791 A1* | 1/2012 | Buelthoff et al. | 701/2 |
| 2013/0204465 A1* | 8/2013 | Phillips et al. | 701/2 |

* cited by examiner

*Primary Examiner* — Behrang Badii
*Assistant Examiner* — Demetra Smith-Stewart
(74) *Attorney, Agent, or Firm* — Novak Druce Connolly Bove + Quigg LLP (57) ABSTRACT

A method for controlling an unmanned aerial vehicle (UAV) using an electronic device obtains movement data of the electronic device detected by an accelerometer of the electronic device, and converts the movement data of the electronic device to control signals. The method further sends the control signals to the UAV, and changes a flight status of the UAV according to the control signals.

19 Claims, 9 Drawing Sheets

| | | | | | |—30 |
|---|---|---|---|---|---|
| | | Converting table | | | |
| Name | Directly controls | Primary effect | Used in forward flight | Used in hover flight | Movement |
| Cyclic (lateral) | Varies main rotor blade pitch with left and right movement | Tilts main rotor disk left and right through the swashplate | To turn the aircraft | To move sideways | FIG. 6A |
| Cyclic (longitudinal) | Varies main rotor blade pitch with fore and aft movement | Tilts main rotor disk forward and back via the swashplate | Control attitude | To move forwards/ backwards | FIG. 6B |
| Collective | Collective angle of attack for the rotor main blades via the swashplate | Increase/decrease pitch angle of all main rotor blades equally, causing the aircraft to ascend/descend | To adjust power through rotor blade pitch setting | To adjust skid height/vertical speed | FIG. 6C |
| Anti-torque pedals | Collective pitch supplied to tail rotor blades | Yaw rate | Adjust sideslip angle | Control yaw rate/ heading | FIG. 6D |

ELECTRONIC DEVICE AND METHOD FOR CONTROLLING UNMANNED AERIAL VEHICLE USING THE SAME

BACKGROUND

1. Technical Field

Embodiments of the present disclosure relate to helicopter control technology, and particularly to an electronic device and method for controlling an unmanned aerial vehicle (UAV) using the electronic device.

2. Description of Related Art

UAVs have been used to perform security surveillance by capturing images of a number of monitored scenes, and sending the captured images to a monitoring computer. However, a flight status of the UAV needs to be changed using a special controller installed with the monitoring computer. That is to say, if an administrator wants to change the flight status of the UAV, the administrator has to go back to the monitoring computer. Accordingly, it is inefficient to control the UAV. Therefore, an efficient method for controlling the flight status of the UAV is desired.

DETAILED DESCRIPTION

All of the processes described below may be embodied in, and fully automated via, functional code modules executed by one or more general purpose electronic devices or processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Figure 1:
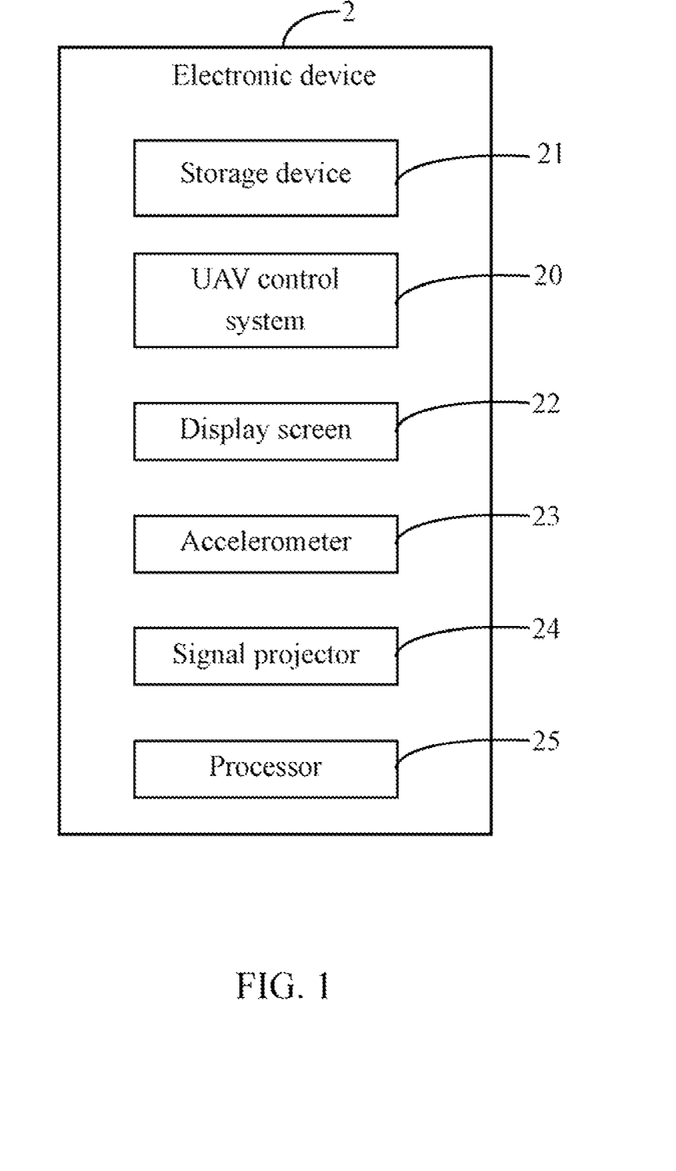
FIG. 1 is a block diagram of one embodiment of an electronic device.

FIG. 1 is a block diagram of one embodiment of an electronic device 2. In one embodiment, the electronic device 2 includes a storage device 21, an unmanned aerial vehicle (UAV) control system 20, a display screen 22, an accelerometer 23, a signal projector 24, and at least one processor 25. The UAV control system 20 may be used to obtain movement data of the electronic device 2 detected by the accelerometer 23, and change a flight status of the UAV according to the movement data of the electronic device 2. A detailed description will be given in the following paragraphs.

In one embodiment, the accelerometer 23 may include, but is not limited to, a two-axis accelerometer, a three-axis accelerometer, a two-axis gyro, and a three-axis gyro. The UAV may have a signal receiver installed to receive control signals sent from the signal projector 24 of the electronic device 2.

In one embodiment, the display screen 22 may be a liquid crystal display (LCD) or a touch-sensitive display, for example. The electronic device 2 may be a mobile phone, a personal digital assistant (PDA) or any other suitable communication device.

In one embodiment, the UAV control system 20 may include one or more modules. The one or more modules may comprise computerized code in the form of one or more programs that are stored in the storage device 21 (or memory). The computerized code includes instructions that are executed by the at least one processor 25 to provide functions for the one or more modules.

Figure 2:
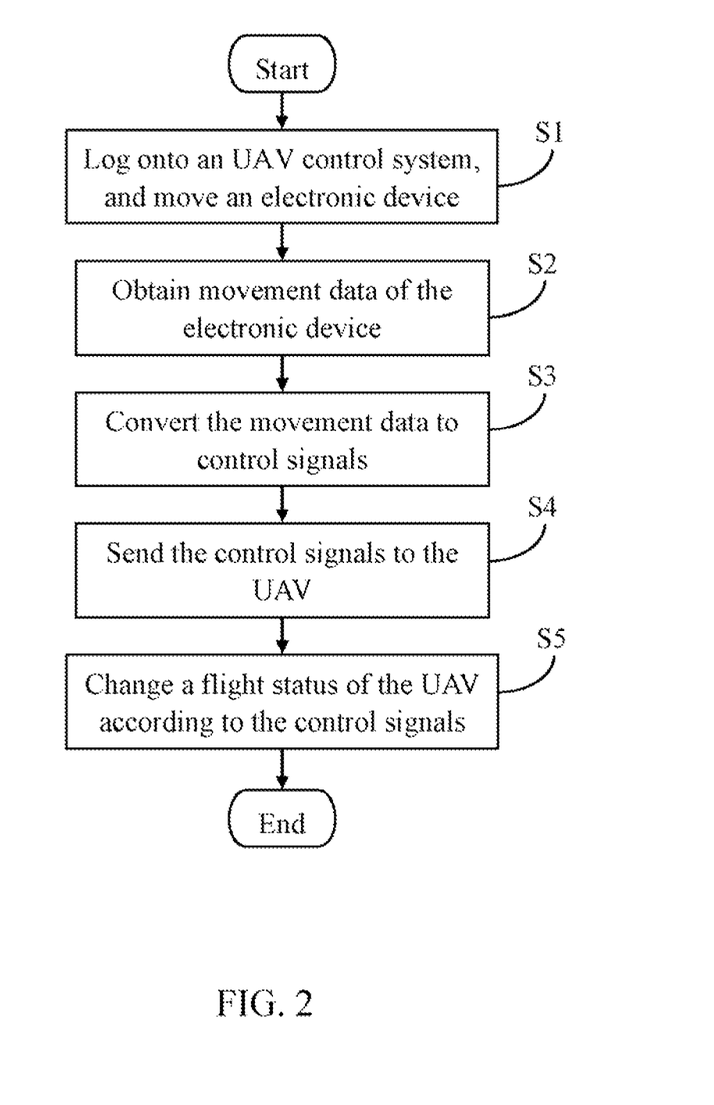
FIG. 2 is a flowchart of one embodiment of a method for controlling an unmanned aerial vehicle using the electronic device in FIG. 1.

FIG. 2 is a flowchart of one embodiment of a method for controlling the UAV using the electronic device 2 in FIG. 1. The method in FIG. 2 may be performed by the electronic device (e.g. a mobile phone) having a touch-sensitive display with a graphical user interface (GUI), at least one processor, a storage device and one or more modules, programs or sets of instructions stored in the storage device for performing the method in FIG. 2. In one embodiment, the electronic device provides a number of functions, including wireless communication, for example. Depending on the embodiment, additional blocks may be added, others removed, and the ordering of the blocks may be changed.

Figure 5:
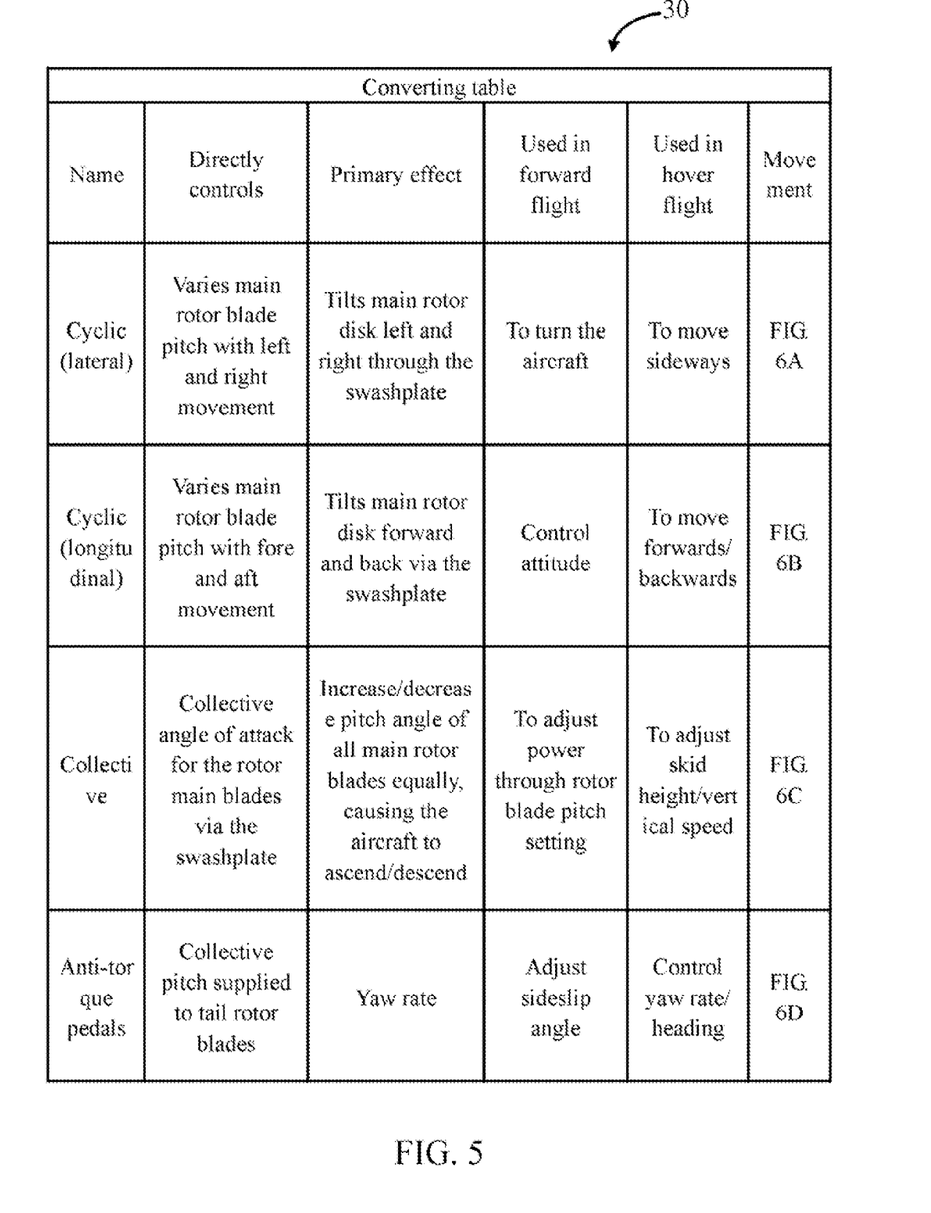
FIG. 5 is a schematic diagram of one embodiment of a converting table for converting the movement data of the electronic device to different control signals.

In block S1, a user logs onto the UAV control system 20, and moves the electronic device 2. In one embodiment, a movement of the electronic device 2 may be a upward movement, a downward movement, a leftward movement, or a rightward movement. In one embodiment, the UAV in this embodiment includes a cyclic control, a collective pitch control, and anti-torque pedals. Detailed descriptions of primary effects of each control on the UAV are shown in FIG. 5.

Figure 3:
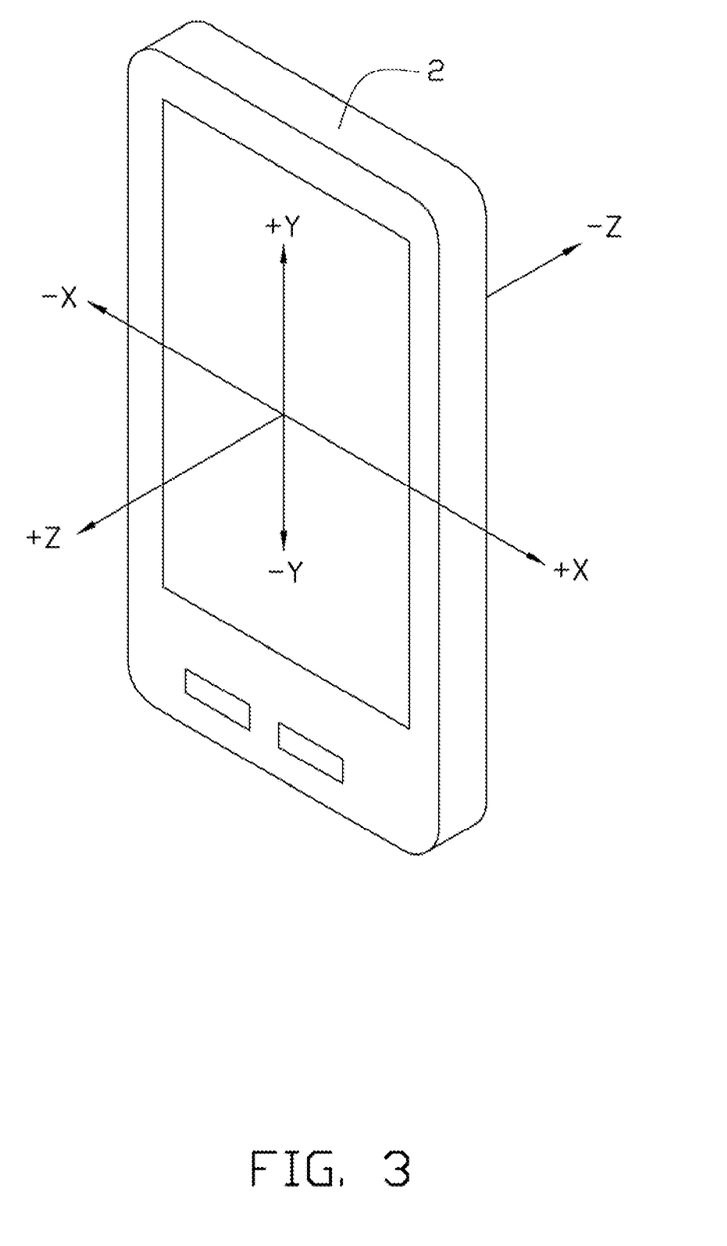
FIG. 3 is a schematic diagram of one embodiment of a three dimension coordinate system of the electronic device in FIG. 1.
Figure 4:
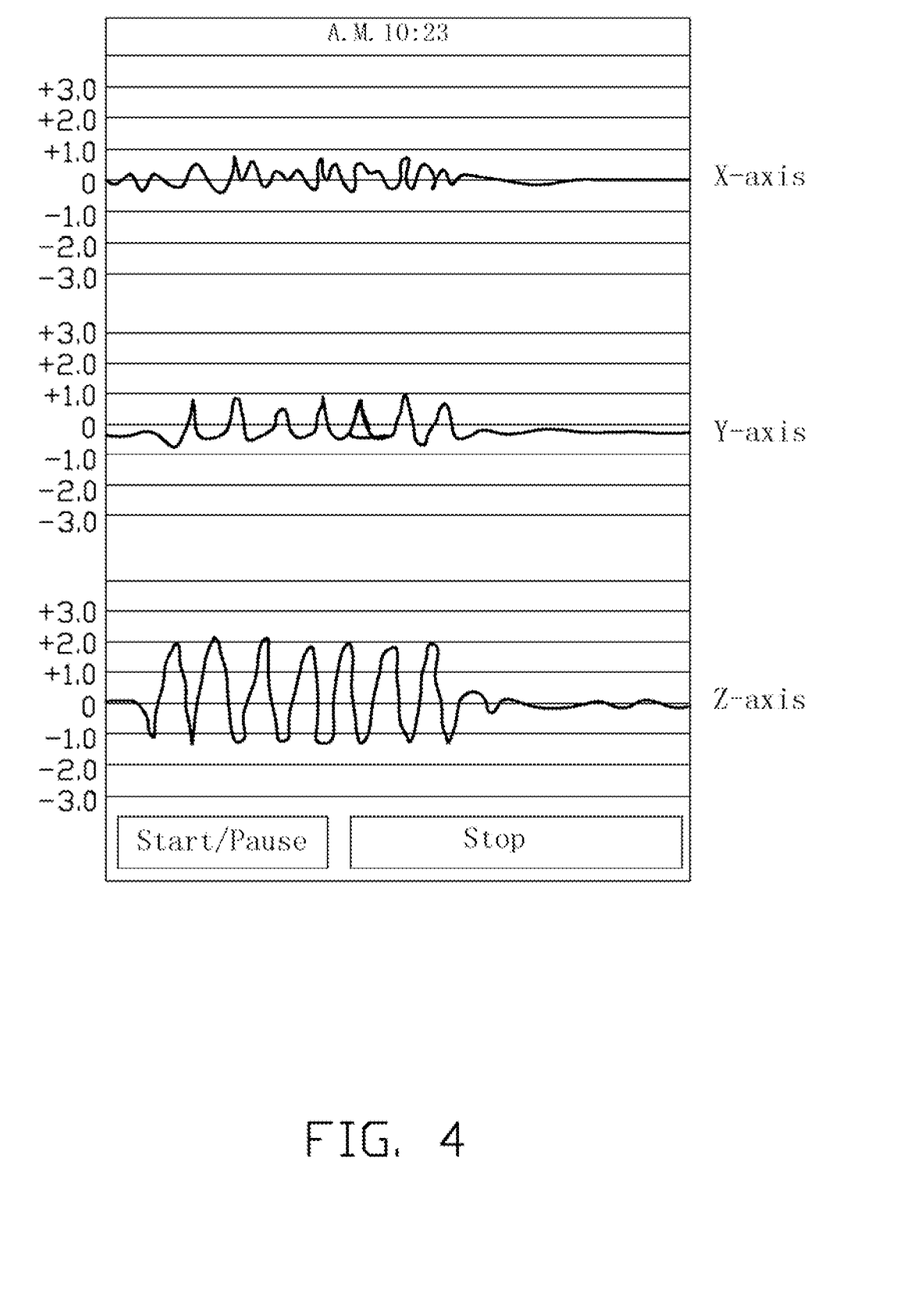
FIG. 4 is a schematic diagram of one embodiment of movement data detected by an accelerometer when the electronic device is moving.

In block S2, the UAV control system 20 obtains movement data of the electronic device 2 detected by the accelerometer 23 of the electronic device 2. Referring to FIG. 3 and FIG. 4, the movement data of the electronic device 2 may include movement directions and movement distances of the electronic device 2 based on a three dimension coordinate system (i.e., X-Y-Z axes coordinate system). As shown in FIG. 4, the accelerometer 23 detects the movement data of the electronic device 2 along the X-Y-Z axes when the electronic device 2 is moved.

In one embodiment, if the movement distance in the X-axis of the electronic device 2 is less than a first preset value (e.g., 0.1 centimeters), the UAV control system 20 determines that the electronic device 2 does not move along the X-axis. If the movement distance in the Y-axis of the electronic device 2 is less than a second preset value (e.g., 0.2 centimeters), the UAV control system 20 determines that the electronic device 2 does not move along the Y-axis. If the movement distance in the Z-axis of the electronic device 2 is less than a third preset value (e.g., 0.3 centimeters), the UAV control system 20 determines that the electronic device 2 does not move along the Z-axis.

In block S3, the UAV control system 20 converts the movement data of the electronic device 2 to control signals. In one embodiment, the control signals may include, but are not limited to, a first control signal to control lateral motion of the cyclic control of the UAV, a second control signal to control longitudinal motion of the cyclic control of the UAV, a third control signal to control motion of the collective pitch control of the UAV, and a fourth control signal to control motions of the anti-torque pedals of the UAV. A converting table 30, as shown in FIG. 5, converts the movement data of the electronic device 2 to different control signals.

Figure 6A:
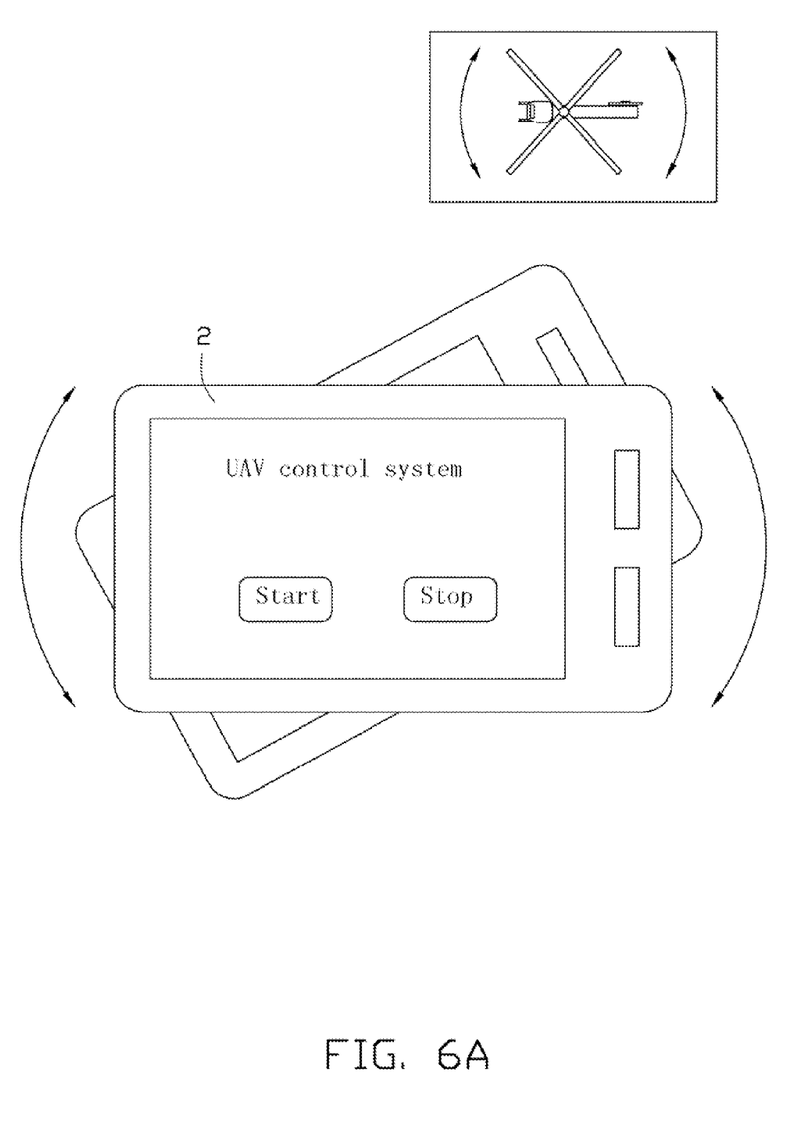
FIG. 6A is a schematic diagram of one embodiment of a movement of the electronic device to generate a first control signal.

In one embodiment, if the electronic device 2 is moved as shown in FIG. 6A, the UAV control system 20 converts the movement data of the electronic device 2 to the first control signal. That is to say, if the movement distance in the X-axis of the electronic device 2 is greater than or equal to the first preset value, the movement distance in the Y-axis of the electronic device 2 is greater than or equal to the second preset value, and the movement distance in the Z-axis of the electronic device 2 is less than the third preset value, the UAV control system 20 converts the movement data of the electronic device 2 to the first control signal.

Figure 6B:
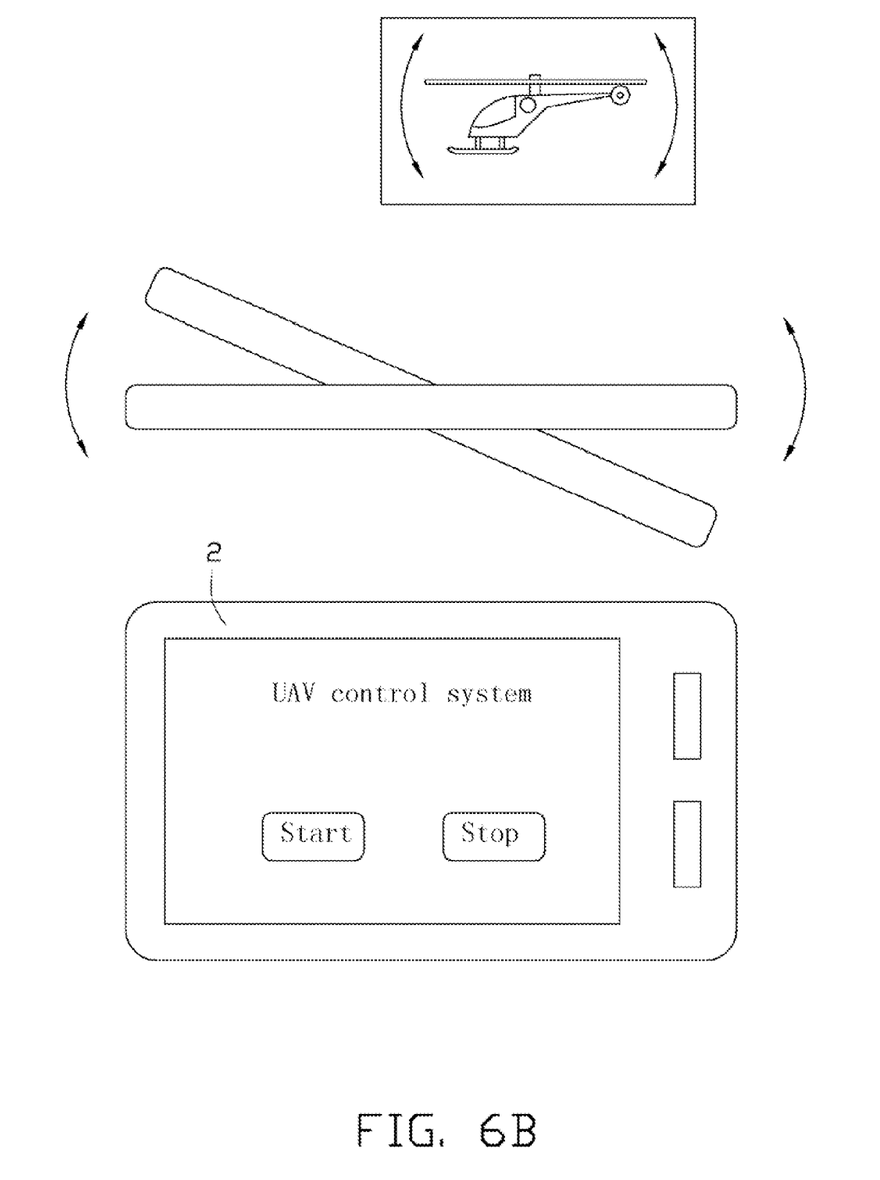
FIG. 6B is a schematic diagram of one embodiment of a movement of the electronic device to generate a second control signal.

If the electronic device 2 is moved as shown in FIG. 6B, the UAV control system 20 converts the movement data of the electronic device 2 to the second control signal. That is to say, if the movement distance in the X-axis of the electronic device 2 is less than the first preset value, the movement distance in the Y-axis of the electronic device 2 is greater than or equal to the second preset value, and the movement distance in the Z-axis of the electronic device 2 is greater than or equal to the third preset value, the UAV control system 20 converts the movement data of the electronic device 2 to the second control signal.

Figure 6C:
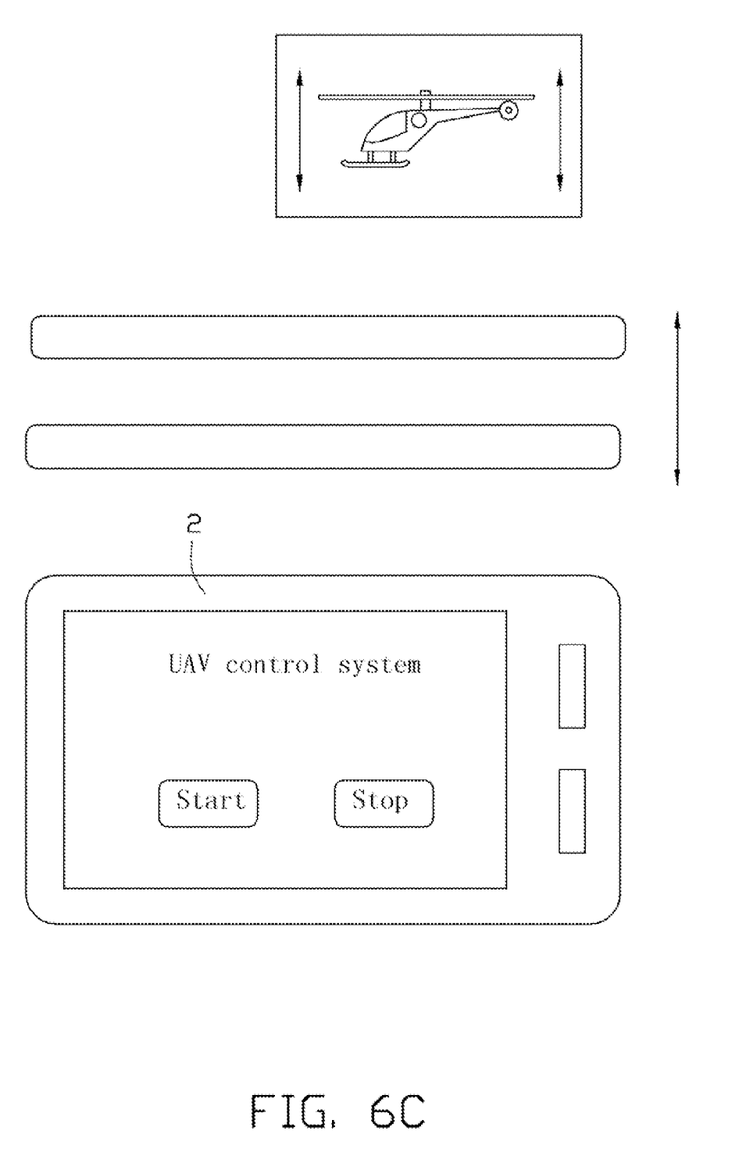
FIG. 6C is a schematic diagram of one embodiment of a movement of the electronic device to generate a third control signal.

If the electronic device 2 is moved as shown in FIG. 6C, the UAV control system 20 converts the movement data of the electronic device 2 to the third control signal. That is to say, if the movement distance in the X-axis of the electronic device 2 is less than the first preset value, the movement distance in the Y-axis of the electronic device 2 is less than the second preset value, and the movement distance in the Z-axis of the electronic device 2 is greater than or equal to the third preset value, the UAV control system 20 converts the movement data of the electronic device 2 to the third control signal.

Figure 6D:
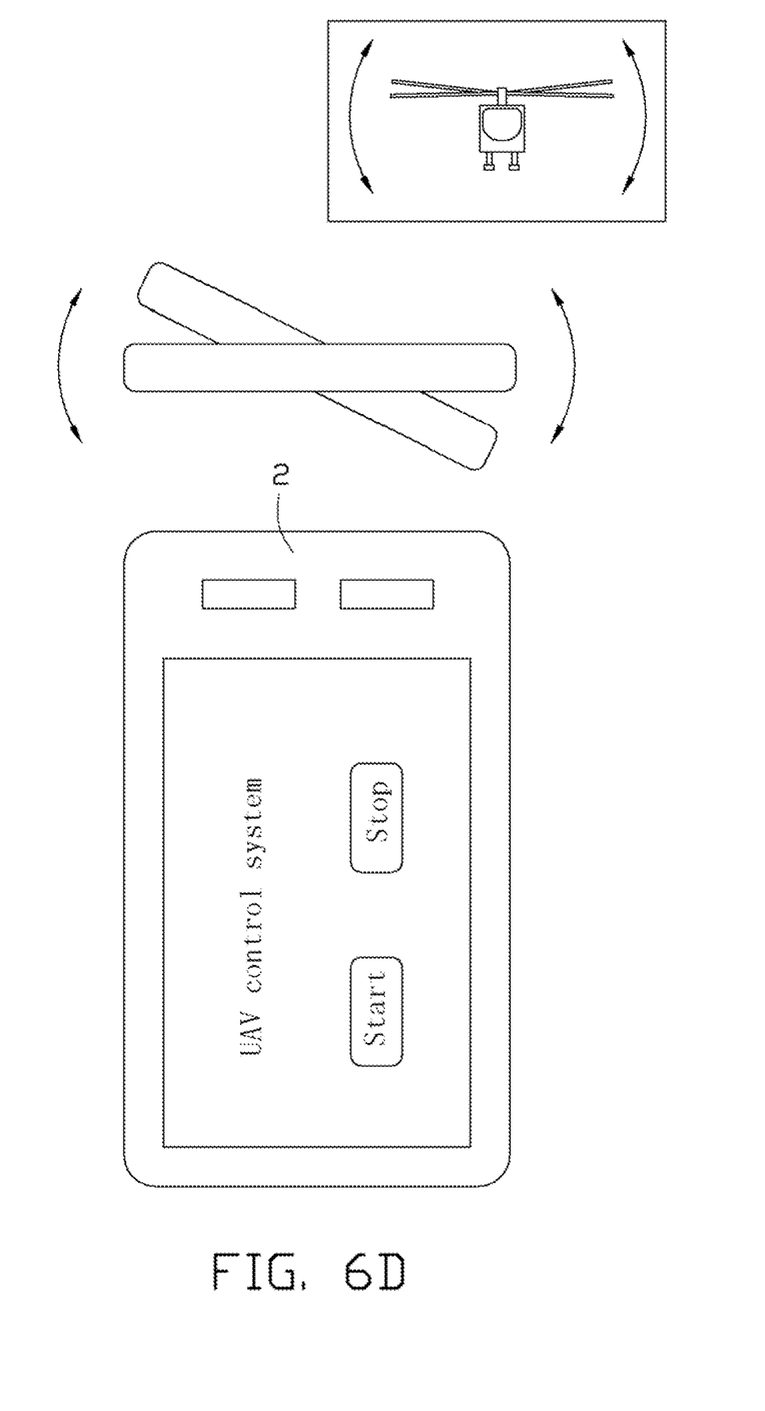
FIG. 6D is a schematic diagram of one embodiment of a movement of the electronic device to generate a fourth control signal.

If the electronic device 2 is moved as shown in FIG. 6D, the UAV control system 20 converts the movement data of the electronic device 2 to the fourth control signal. That is to say, if the movement distance in the X-axis of the electronic device 2 is greater than or equal to the first preset value, the movement distance in the Y-axis of the electronic device 2 is less than the second preset value, and the movement distance in the Z-axis of the electronic device 2 is greater than or equal to the third preset value, the UAV control system 20 converts the movement data of the electronic device 2 to the fourth control signal.

In block S4, the UAV control system 20 sends the control signals to the UAV through the signal projector 24.

In block S5, the UAV control system 20 changes the flight status of the UAV according to the control signals. For example, if the electronic device 2 moves one centimeter towards left, the UAV control system 20 controls the UAV to move six centimeters towards left.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for controlling an unmanned aerial vehicle (UAV) using an electronic device, comprising:
    obtaining movement data of the electronic device detected by an accelerometer of the electronic device, the movement data of the electronic device comprising movement distances of the electronic device based on a three dimension coordinate system;
    converting the movement data of the electronic device to control signals of the UAV by comparing the movement distance in an X-axis of the electronic device with a first preset value, comparing the movement distance in a Y-axis of the electronic device with a second preset value, and comparing the movement distance in an Z-axis of the electronic device with a third preset value, and sending the control signals to the UAV, where a first control signal of the UAV is determined when the electronic device is rotated along the Z-axis of the electronic device, a second control signal of the UAV is determined when the electronic device is rotated along the X-axis of the electronic device, a third control signal of the UAV is determined when the electronic device is moved vertically along the Z-axis of the electronic device, and a fourth control signal of the UAV is determined when the electronic device is rotated along the Y-axis of the electronic device, and the electronic device being determined as not moving along the X-axis when the movement distance in the X-axis of the electronic device is less than the first preset value; and
    changing a flight status of the UAV according to the control signals.

2. The method according to claim 1, wherein the movement data of the electronic device further comprise movement directions of the electronic device based on the three dimension coordinate system.

3. The method according to claim 2, wherein the control signals comprise: a first control signal to control lateral motion of a cyclic control of the UAV, a second control signal to control longitudinal motion of the cyclic control of the UAV, a third control signal to control motion of a collective pitch control of the UAV, and a fourth control signal to control motions of anti-torque pedals of the UAV.

4. The method according to claim 3, wherein the step of converting the movement data of the electronic device to control signals of the UAV comprises:
    converting the movement data of the electronic device to the first control signal upon the condition that the movement distance in the X-axis of the electronic device is greater than or equal to the first preset value, the movement distance in the Y-axis of the electronic device is greater than or equal to the second preset value, and the movement distance in the Z-axis of the electronic device is less than the third preset value;
    converting the movement data of the electronic device to the second control signal upon the condition that the movement distance in the X-axis of the electronic device is less than the first preset value, the movement distance in the Y-axis of the electronic device is greater than or equal to the second preset value, and the movement distance in the Z-axis of the electronic device is greater than or equal to the third preset value;

converting the movement data of the electronic device to the third control signal upon the condition that the movement distance in the X-axis of the electronic device is less than the first preset value, the movement distance in the Y-axis of the electronic device is less than the second preset value, and the movement distance in the Z-axis of the electronic device is greater than or equal to the third preset value; or converting the movement data of the electronic device to the fourth control signal upon the condition that the movement distance in the X-axis of the electronic device is greater than or equal to the first preset value, the movement distance in the Y-axis of the electronic device is less than the second preset value, and the movement distance in the Z-axis of the electronic device is greater than or equal to the third preset value.

5. The method according to claim 1, wherein the accelerometer is a two-axis accelerometer, a three-axis accelerometer, a two-axis gyro, or a three-axis gyro.

6. The method according to claim 1, wherein the X-axis of the electronic device is determined to be a horizontal axis of a display screen of the electronic device, the Y-axis of the electronic device is determined to be a vertical axis of the display screen of the electronic device, and the X-axis of the electronic device is perpendicular to a plane of the display screen of the electronic device.

7. The method according to claim 1, further comprising: determining that the electronic device does not move along the Y-axis when the movement distance in the Y-axis of the electronic device is less than a second preset value.

8. The method according to claim 1, further comprising: determining that the electronic device does not move along the Z-axis when the movement distance in the Z-axis of the electronic device is less than a third preset value.

9. An electronic device, comprising:
a display screen;
a storage device;
at least one processor; and
one or more modules that are stored in the storage device and are executed by the at least one processor, the one or more modules comprising instructions:
to obtain movement data of the electronic device detected by an accelerometer of the electronic device, the movement data of the electronic device comprising movement distances of the electronic device based on a three dimension coordinate system;
to convert the movement data of the electronic device to control signals of an unmanned aerial vehicle (UAV) by comparing the movement distance in an X-axis of the electronic device with a first preset value, comparing the movement distance in a Y-axis of the electronic device with a second preset value, and comparing the movement distance in an Z-axis of the electronic device with a third preset value, and send the control signals to the UAV, where a first control signal of the UAV is determined when the electronic device is rotated along the Z-axis of the electronic device, a second control signal of the UAV is determined when the electronic device is rotated along the X-axis of the electronic device, a third control signal of the UAV is determined when the electronic device is moved vertically along the Z-axis of the electronic device, and a fourth control signal of the UAV is determined when the electronic device is rotated along the Y-axis of the electronic device, and the electronic device being determined as not moving along the X-axis when the movement distance in the X-axis of the electronic device is less than the first preset value; and to change a flight status of the UAV according to the control signals.

10. The electronic device according to claim 9, wherein the movement data of the electronic device further comprise movement directions of the electronic device based on the three dimension coordinate system.

11. The electronic device according to claim 10, wherein the control signals comprise: a first control signal to control lateral motion of a cyclic control of the UAV, a second control signal to control longitudinal motion of the cyclic control of the UAV, a third control signal to control motion of a collective pitch control of the UAV, and a fourth control signal to control motions of anti-torque pedals of the UAV.

12. The electronic device according to claim 11, wherein the instruction to convert the movement data of the electronic device to control signals of the UAV comprises:
converting the movement data of the electronic device to the first control signal upon the condition that the movement distance in the X-axis of the electronic device is greater than or equal to the first preset value, the movement distance in the Y-axis of the electronic device is greater than or equal to the second preset value, and the movement distance in the Z-axis of the electronic device is less than the third preset value;
converting the movement data of the electronic device to the second control signal upon the condition that the movement distance in the X-axis of the electronic device is less than the first preset value, the movement distance in the Y-axis of the electronic device is greater than or equal to the second preset value, and the movement distance in the Z-axis of the electronic device is greater than or equal to the third preset value;
converting the movement data of the electronic device to the third control signal upon the condition that the movement distance in the X-axis of the electronic device is less than the first preset value, the movement distance in the Y-axis of the electronic device is less than the second preset value, and the movement distance in the Z-axis of the electronic device is greater than or equal to the third preset value; or
converting the movement data of the electronic device to the fourth control signal upon the condition that the movement distance in the X-axis of the electronic device is greater than or equal to the first preset value, the movement distance in the Y-axis of the electronic device is less than the second preset value, and the movement distance in the Z-axis of the electronic device is greater than or equal to the third preset value.

13. The electronic device according to claim 9, wherein the accelerometer is a two-axis accelerometer, a three-axis accelerometer, a two-axis gyro, or a three-axis gyro.

14. A non-transitory storage medium having stored thereon instructions that, when executed by a processor of an electronic device, causes the processor to perform a method for controlling an unmanned aerial vehicle (UAV) using the electronic device, the method comprising:
obtaining movement data of the electronic device detected by an accelerometer of the electronic device, the movement data of the electronic device comprising movement distances of the electronic device based on a three dimension coordinate system;
converting the movement data of the electronic device to control signals of the UAV by comparing the movement distance in an X-axis of the electronic device with a first preset value, comparing the movement distance in a Y-axis of the electronic device with a second preset value, and comparing the movement distance in an Z-axis of the electronic device with a third preset value, and sending the control signals to the UAV, where a first control signal of the UAV is determined when the electronic device is rotated along the Z-axis of the electronic device, a second control signal of the UAV is determined when the electronic device is rotated along the X-axis of the electronic device, a third control signal of the UAV is determined when the electronic device is moved vertically along the Z-axis of the electronic device, and a fourth control signal of the UAV is determined when the electronic device is rotated along the Y-axis of the electronic device, and the electronic device being determined as not moving along the X-axis when the movement distance in the X-axis of the electronic device is less than the first preset value; and changing a flight status of the UAV according to the control signals.

15. The non-transitory storage medium according to claim 14, wherein the movement data of the electronic device further comprise movement directions of the electronic device based on the three dimension coordinate system.

16. The non-transitory storage medium according to claim 15, wherein the control signals comprise: a first control signal to control lateral motion of a cyclic control of the UAV, a second control signal to control longitudinal motion of the cyclic control of the UAV, a third control signal to control motion of a collective pitch control of the UAV, and a fourth control signal to control motions of anti-torque pedals of the UAV.

17. The non-transitory storage medium according to claim 16, wherein the step of converting the movement data of the electronic device to control signals of the UAV comprises:

converting the movement data of the electronic device to the first control signal upon the condition that the movement distance in the X-axis of the electronic device is greater than or equal to the first preset value, the movement distance in the Y-axis of the electronic device is greater than or equal to the second preset value, and the movement distance in the Z-axis of the electronic device is less than the third preset value;

converting the movement data of the electronic device to the second control signal upon the condition that the movement distance in the X-axis of the electronic device is less than the first preset value, the movement distance in the Y-axis of the electronic device is greater than or equal to the second preset value, and the movement distance in the Z-axis of the electronic device is greater than or equal to the third preset value;

converting the movement data of the electronic device to the third control signal upon the condition that the movement distance in the X-axis of the electronic device is less than the first preset value, the movement distance in the Y-axis of the electronic device is less than the second preset value, and the movement distance in the Z-axis of the electronic device is greater than or equal to the third preset value; or converting the movement data of the electronic device to the fourth control signal upon the condition that the movement distance in the X-axis of the electronic device is greater than or equal to the first preset value, the movement distance in the Y-axis of the electronic device is less than the second preset value, and the movement distance in the Z-axis of the electronic device is greater than or equal to the third preset value.

18. The non-transitory storage medium according to claim 14, wherein the accelerometer is a two-axis accelerometer, a three-axis accelerometer, a two-axis gyro, or a three-axis gyro.

19. The non-transitory storage medium according to claim 14, wherein the medium is selected from the group consisting of a hard disk drive, a compact disc, a digital video disc, and a tape drive.

* * * * *